United States Patent [19]

Naskali

[11] Patent Number: 5,446,364
[45] Date of Patent: Aug. 29, 1995

[54] FAST CHARGING ARRANGEMENT

[75] Inventor: Matti Naskali, Yliskulma, Finland

[73] Assignee: Nokia Mobile Phones Ltd., Salo, Finland

[21] Appl. No.: 836,092

[22] Filed: Feb. 14, 1992

[30] Foreign Application Priority Data

Feb. 25, 1991 [FI] Finland .................. 910902

[51] Int. Cl.⁶ ............................ H02J 7/00
[52] U.S. Cl. ............................ 320/2; 320/36
[58] Field of Search .......... 320/2, 31, 35, 36

[56] References Cited

U.S. PATENT DOCUMENTS

| | | | |
|---|---|---|---|
| 3,518,524 | 6/1970 | Roszyk | 320/2 |
| 3,935,525 | 1/1976 | Elson et al. | 320/35 |
| 4,558,270 | 12/1985 | Liautaud et al. | 320/2 |
| 4,588,938 | 5/1986 | Liautaud et al. | 320/2 |
| 4,631,468 | 12/1986 | Satoh | 320/14 |
| 4,829,224 | 5/1989 | Gandelman | 320/2 |
| 4,829,226 | 5/1989 | Nakamura et al. | 320/2 |
| 4,835,409 | 5/1989 | Bhagwat et al. | 307/64 |
| 4,878,007 | 10/1989 | Gábor et al. | 320/14 |
| 4,910,103 | 3/1990 | Yoshikawa et al. | 429/61 |
| 4,922,178 | 5/1990 | Matuszewski et al. | 320/2 |
| 5,036,284 | 7/1991 | Cichanski | 324/433 |
| 5,115,182 | 5/1992 | Ehmke et al. | 320/14 |
| 5,140,249 | 8/1992 | Linder et al. | 320/2 |

FOREIGN PATENT DOCUMENTS

| | | | |
|---|---|---|---|
| 2733594 | 2/1979 | Germany | H02J 7/10 |
| 1046163 | 10/1966 | United Kingdom . | |
| 2242793 | 10/1991 | United Kingdom | H02J 7/00 |
| 9116753 | 10/1991 | WIPO | H02J 7/10 |

*Primary Examiner*—Thomas M. Dougherty
*Attorney, Agent, or Firm*—Darby & Darby

[57] ABSTRACT

In a fast charging arrangement between a charger (20) and a battery-powered device (20) the charging current of the battery (36) is controlled with a logic arrangement (38) as a function of the charging state and/or temperature of the battery. According to the invention, the connection (10, 12) between the charger (10) and the battery-powered device (30) is bipolar, the logic arrangement (38) having been disposed in the battery-powered device (30), advantageously in a mobile telephone.

5 Claims, 1 Drawing Sheet

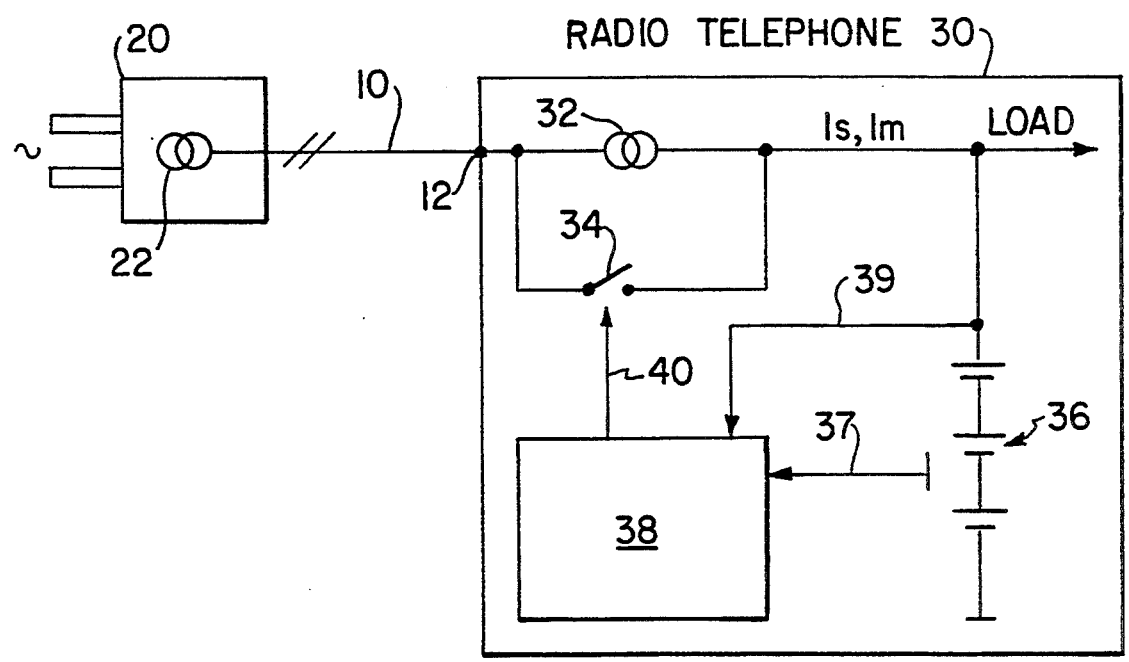

FAST CHARGING ARRANGEMENT

BACKGROUND OF THE INVENTION

The present invention relates to a fast charging arrangement between a charger and a battery-powered device.

A rechargeable battery, for instance a Ni—Cd battery, is used especially in portable devices, such as radio-telephones, as the current source of the device. Such batteries must be regularly recharged, a discrete charger being commonly used for this purpose, among others in order to reduce the weight of the mobile or portable device maximally.

In known fast charging arrangements, a three-conductor connection is used between the charger and the device to be charged, the conductors being plus (current feed conductor), ground (return conductor) and the signal conductor for measuring the battery temperature. The temperature signal is used for controlling the charge current of the battery from fast charge to trickle current, when the temperature has reached a preset maximal value. The charging current may also be controlled in terms of the voltage, but the battery temperature has to be supervised in this case as well, the charging being impossible with a battery that is heated or cooled too much. The temperature and voltage control requires control circuits, which so far have been incorporated in the charger or in a charger-support assembly. For this reason, several conductors are required between the charging control logic and the battery to be charged. In prior art solutions, this has been resolved with a three-conductor connection between the charger and the battery-powered device. This is an expensive and in some cases even an impractical connection, given that the contacts needed are not particularly common.

SUMMARY OF THE INVENTION

The object of the invention was thus to achieve a less complicated fast charging arrangement between a fast charger and a battery-powered device, in which more ordinary and inexpensive contacts could be used.

A two-conductor contact is considerably less expensive than a three-wire one, because a two-wire current contact represents a more frequent standard. The arrangement according to the invention also allows a charger with a more economical construction, since no control logic is required.

A preferred embodiment of the invention uses a charger for the trickle charging, in which the constant current generator generates a constant current that is equal to the trickle current of the device to be charged. This charger may be of the most economical standard type, which involves a slow charging of the battery.

BRIEF DESCRIPTION OF THE DRAWING

The enclosed FIGURE is a schematic view of the main components and connections of the fast charging connection.

DESCRIPTION OF THE PREFERRED EMBODIMENT

The FIGURE shows the charger 20, which basically only contains the constant current generator 22. When needed, the charger is connected via the two-conductor wire 10 to the battery-operated device 30 to be charged, such as a radio-telephone. Matching bipolar contacts 12 are provided in the wire 10 and the device 30.

In a simple embodiment, a simple and inexpensive transformer/constant current generator configuration plugged in the flex plug is usable as the charger 20. The charger may also be disposed in a table support, and in that case no wire 10 is needed, but the contact 12 of the device 30 is coupled directly to the contact (not represented) provided in the support. The charger 20 is connected to the mains current for the duration of the operation and it may be equipped with signal lights (not represented) indicating the operation.

The battery-powered device 30 contains a battery 36 feeding the load, in this case a Ni—Cd battery, which has to be recharged with a charger after its discharge. The battery 36 may instead be a nickel-hydride battery. According to the invention, a shunt switch 34 is plugged into the circuit of the charger connection 12, the fast charging current being directed to the battery 36 from the charger connection when the shunt switch is closed. The connection 12 also supplies the current of the constant current generator 32, which generates the trickle current of the battery 36, when its shunt switch 34 is open.

The switch 34 is controlled with the control logic 38 via the wire 40. The logic operates according to a principle known per se in function of the voltage 39 and the temperature 37 of the battery. The discharged battery 36 is usually recharged in two steps, the first one being called fast charge. In this step, the logic 38 guides the switch 34 into a closed state, bridging the AC generator 32. Thus, the maximal current $Is = C/1h$ generated by the battery 20 is conducted directly to the battery, C representing the charger capacity (with Ah as a unit), i.e. the current Is equals full charging of the battery during one hour. Depending on the variations of the battery capacity and the charging state of the battery at the outset of the fast charging, the fast charging with the current Is can be continued only until the measured temperature 37 of the battery has reached the end limit of the charging, or until the temperature has increased as much as allowed. Optionally, the fast charging is stopped when the battery voltage 39 has begun to drop or when the predetermined charge has been fed into the battery 36. In all the options, the battery temperature must be measured, since the charging is impossible with a battery that is heated or cooled too much. The charging mode has no crucial bearing on the invention.

After the fast charge step, the control logic 38 conducts the switch 34 into an open state, the trickle current $Im = C/10h$ generated by the constant current generator 32 of the device 30 itself being directed to the battery 36. Optionally the trickle current may be generated by pulsing, i.e., intermittently closing, the switch 34.

The charging connection according to the invention permits the use of a simple design, which does not require the previously frequent control logic. The connection between the charger 20 and the device 30 is a simple two-conductor connection 12, enabling the use of an economical bipolar standard current contact. The invention also yields a less complicated design of the device 30, since no separate control or feedback line (37, 39) has to be taken out from the device. In the device 30, the control logic of the fast charging can advantageously be associated with the logic controlling the other operations of the device, e.g. a microprocessor.

I claim:

1. A fast charging apparatus, comprising:
    a battery-powered radio telephone device having a battery to be recharged;
    a charger means separate from the battery powered radio telephone for charging the battery of the battery-powered radio telephone device with charging current and voltage, said charger means having a constant-current generator for generating a constant current; and
    a connection between said charger and said battery-powered radio telephone device, said connection having only two spaced apart conductors extending and making connection between said charger and said battery-powered radio telephone device; the battery-powered radio telephone device comprising:
        a shunt switch in electrical connection with a charger connection of said two-conductor connection and being controllable between open and closed positions,
        means for controlling, as a function of at least a charging state and temperature of the battery which powers said battery-powered radio telephone device, the position of said shunt switch, said controlling means including a logic arrangement within the battery-powered radio telephone device; and
        means for conducting the constant current to the battery from the charger connection in response to said shunt switch being in said closed position.

2. An apparatus as in claim 1, wherein said constant current generator means of said charger means generates the constant current to equal a fast charging current of the battery to be recharged.

3. An apparatus as in claim 1, wherein said radio telephone device including constant trickle current generator means for generating a trickle current of the battery to be recharged, said trickle current generator receiving the output of said charger and supplying the trickle current when said shunt switch is open.

4. An apparatus as in claim 1, wherein the battery to be recharged is any one of a nickel-cadmium battery and a nickel-hydride battery.

5. An apparatus as in claim 1, wherein said constant current generator means generates a trickle current of the battery by intermittent operation of said shunt switch in response to said logic arrangement.

* * * * *